July 11, 1933.　　　　　R. J. GRAY　　　　　1,917,966
LUBRICATING SYSTEM
Filed May 20, 1931　　　　2 Sheets-Sheet 1

INVENTOR.
RUSSELL J. GRAY.
BY
ATTORNEY.

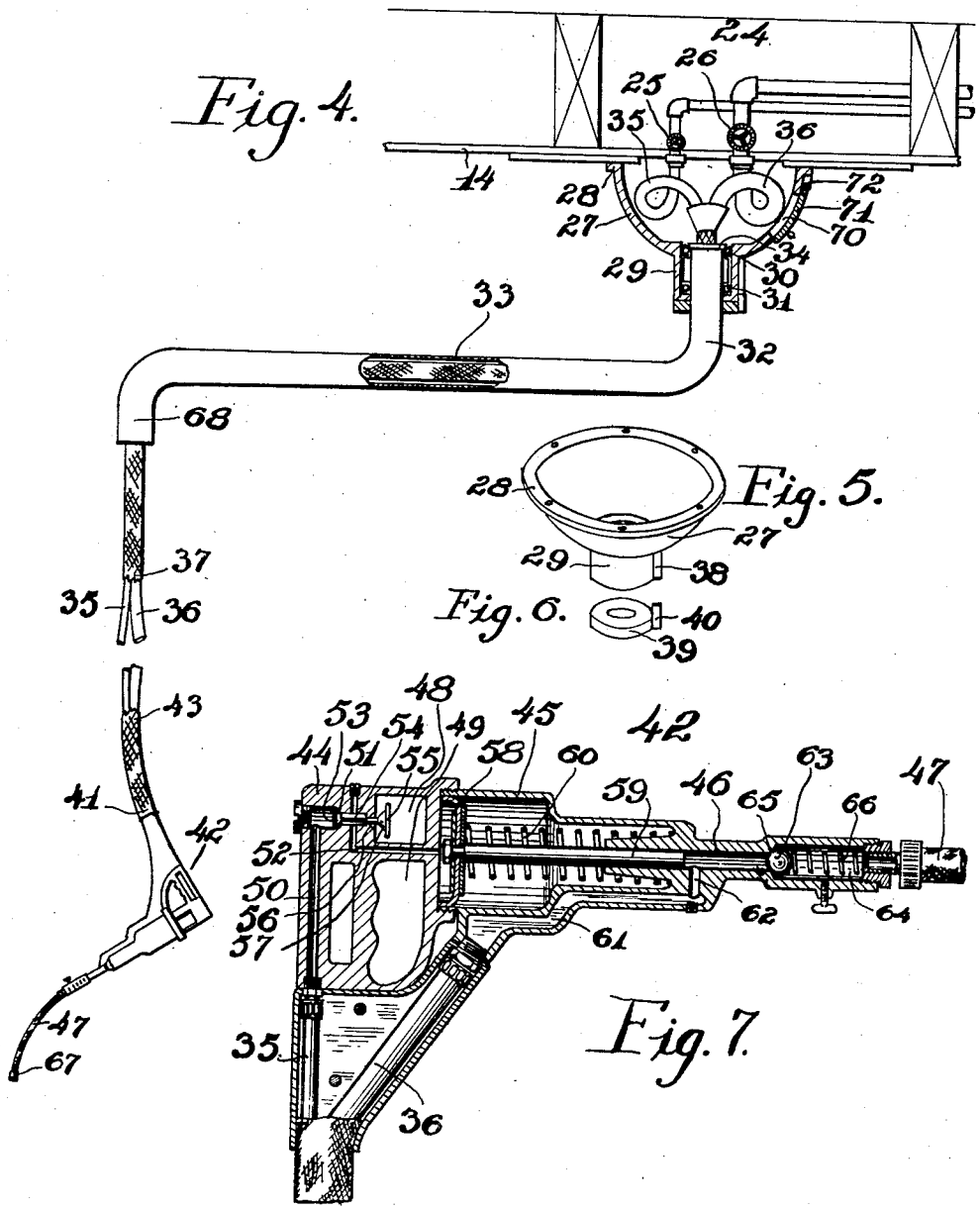

Patented July 11, 1933

1,917,966

UNITED STATES PATENT OFFICE

RUSSELL J. GRAY, OF MINNEAPOLIS, MINNESOTA

LUBRICATING SYSTEM

Application filed May 20, 1931. Serial No. 538,803.

My invention relates to a new and useful lubricating system, and it relates more particularly to a lubricating system adapted for high pressure lubrication of automobiles and the like.

It is the object of my invention to provide means whereby lubricant under high pressure may be applied to an automobile or the like, and whereby the lubricating operation might be effected quickly and with great facility, without interference from hose lines or other connections which may be in the way of the operator.

Thus, it is an object of my invention to supply lubricant under high pressure to the point to be lubricated, by means which will afford the minimum interference and obstruction to the operator while lubricating or while working about the automobile.

It is a further object of my invention to provide means whereby the lubricant may be conveyed to within proximity of the final point of lubrication under a comparatively low pressure and whereby the pressure on the lubricant may there be increased, by pneumatic means;—likewise, however, without pneumatic hose lines which would interfere with the operator, or which might tend to constitute obstructions about the automobile.

With the above and other objects in view, which will appear more fully from the following detailed description, my invention consists of a lubricating system, for use in connection with automobile lifts or elevating means, including a remote source of lubricant under relatively low pressure, a remote source of compressed air under comparatively low pressure, and a lubricant and a compressed air conduit leading from said respective sources of supply to a point above the automobile lift or elevating means, said point being preferably on the ceiling above the automobile lift, a generally horizontally extending arm pivotally supported from the ceiling, or the like at said point above the automobile lift and adapted to swing in a generally horizontal plane, lubricant and compressed air conduits carried by said arm having flexible connections at the pivoted end of said arm, with the lubricant and compressed air conduits leading from the respective sources of supply, and continuing in flexible pendent conduits extending downwardly beyond the free end of said arm, and means pendently supported at the lower ends of said pair of flexible conduits for causing the compressed air to act upon the lubricant under low pressure so as to increase the pressure of said lubricant and to discharge the same under said increased pressure, and means for detachable connection with the bearing of the automobile to be lubricated.

My invention further consists of other novel features which will appear more fully from the following detailed description:

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized, and that my invention is not limited to the precise arrangement and organization of the instrumentalities as herein shown and described.

Referring to the drawings in which like reference characters indicate like parts, Figure 1 represents a somewhat diagrammatic perspective view of the novel lubricating system embodying my invention;

Figure 4 represents a vertical view, partly in section, of the pivotal arm forming part of my novel lubricating system;

Figure 5 represents a perspective view of the pivotal socket for the pivotal arm;

Figure 6 represents a perspective view of the stop collar normally affixed to the pivoted end of the arm;

Figure 7 represents a section on an enlarged scale, of the lubricant discharging means at the end of the pendent flexible conduits.

My novel lubricating system is especially adapted for service station installation, and is in the nature of a permanent installation, as distinguished from a portable lubricating system.

Figure 1:
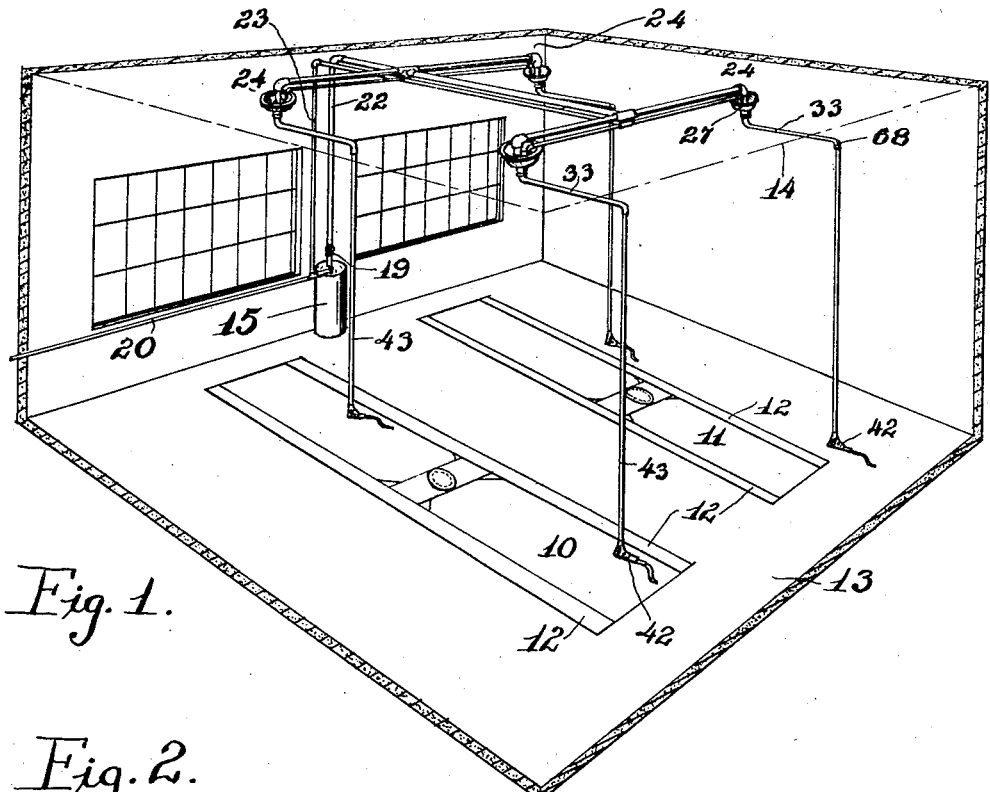
Figure 2:
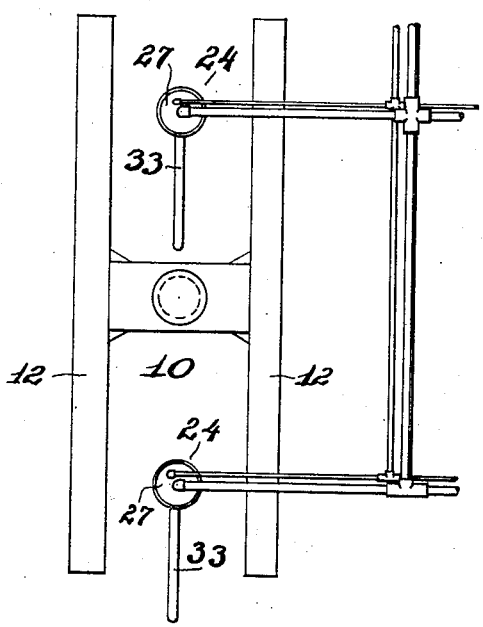
Figure 2 represents a top plan view of the lift and arm in relation thereto.
Figure 3:
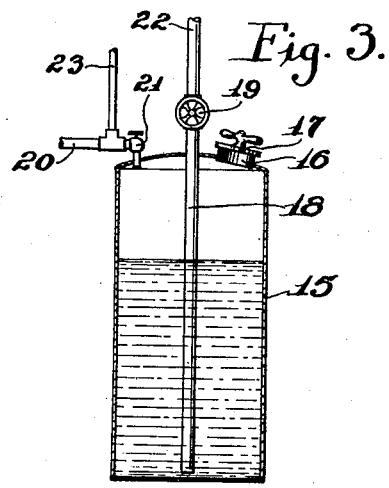
Figure 3 represents a vertical sectional view of the lubricant supply reservoir.

In Figure 1 I have illustrated, in a somewhat diagrammatical manner, a perspective view of an automobile service station, including any suitable hydraulic or other lifts or automobile elevating means 10 and 11, each having a pair of parallel wheel receiving rails or members 12, on to which the automobile is adapted to be run while said rails are in their lowermost position on the floor 13. The rails 12 are then adapted to be elevated by any suitable hydraulic plunger type of lifting mechanism or by any other suitable lifting mechanism, to a height convenient for lubrication and for affording access to the chassis of the automobile. The ceiling of the service station is omitted, for greater clarity in the illustration;—being represented merely by the line 14.

At any suitable remote part of the service station, I provide a lubricant reservoir tank 15, of any suitable capacity, into which lubricant is adapted to be placed, through any convenient opening 16, which is normally closed air tight by a closure member 17, while the system is in operation. From within proximity of the bottom of the tank 15, a pipe 18 extends upwardly through the top of the tank to a valve 19, by means of which the flow of lubricant from the tank 15 through the pipe 18 may be controlled, so as to render the system operative and inoperative at will.

An air supply pipe 20, from any suitable source of compressed air (not shown) is extended to the lubricant storage tank 15, and is operatively connected to the top of said tank, through a control valve 21, by means of which compressed air may be admitted into the tank 15.

A lubricant conduit line 22 and the air line 23, are extended to the ceiling of the service station, and are then extended along the ceiling, either concealed within the ceilin or exposed on the lower surface of the ceiling, to any suitable number of points 24, above the respective lifts 10 and 11, where they terminate in suitable control valves or shut-off valves 25 and 26 respectively, directly above the arm swivel socket housings 27, which are rigidly secured to the ceiling structure, as indicated particularly in Figure 4.

In the particular illustration of my invention, as shown in Figure 1, two swivel arms are provided above each of the lifts 10 and 11, although a single swivel arm may be provided.

Each of the swivel housings or sockets 27, is a generally hemispherical inverted dome-shaped cast-iron or other similar metallic housing, having a flange 28 adjacent the ceiling or supporting structure, through which any suitable number of bolts or other fastening means may be extended into the ceiling or other supporting structure, rigidly to affix the housing 27 to said ceiling or supporting structure. The housing 27 also includes a downwardly depending cylindrical bearing housing portion 29, within which are mounted the upper and lower ball or roller bearings 30 and 31 respectively. Within the pair of ball or roller bearings 30 and 31, the vertical swivelled end or trunnion end 32 of the swivel arm 33 is operatively disposed. A laterally projecting annular flange 34 carried by the uppermost end of the vertical trunnion end 32, is supported by the upper ball bearing 30, so as to give the swivel arm vertical support or thrust support. The pair of ball bearings 30 and 31 then also, serve to pivotally support the arm 33 about a vertical axis, with a minimum resistance to free swivelling. The outer end of the swivel arm 33 terminates in a downwardly depending portion 68.

A pair of flexible hose 35 and 36, are extended from the shut-off valves 25 and 26 respectively to and through the arm 33, indicated particularly in Figure 4;—each of said hose 35 and 36 being first formed into a loose loop before entering the arm 33, so as to permit free rotation or oscillation of the arm 33, without too great a strain on the hose 35 and 36 within the housing 27. If desired, the hose 35 and 36 may be united into a dual hose, by an exterior braiding or other suitable exterior covering 37. As a further improvement, specifically not forming the subject matter of the present application, I may extend the compressed air hose 35 through the lubricant hose 36, so that one hose will contain the other. This modified improved construction possesses certain advantages which are not here discussed because said improvement is not claimed in this application.

In order that the swivel arm 33 may not be rotated about its pivotal support more than 360 degrees in one direction, a projecting rib or stationary stop 38 is provided on the cylindrical lower portion 29 of the housing 27, preferably formed integrally therewith, and a stop collar 39 having a corresponding movable stop 40, is affixed to the vertical trunnion portion 32 of the swivel arm 33, with the upper end of the stop 40 in alignment with the lower end of the stop 38, so that the abutting engagement of these two stops will limit the rotation of the swivel arm 33 in either direction to approximately 360 degrees. This prevents the undue or harmful twisting of the flexible hose 35 and 36, within the housing 27.

An aperture 70 may be provided through the swivel housing 27 in a position suitable for enabling the operator easily to reach therethrough and to manipulate the hand valves 25 and 26. A suitable closing means such as the door 71 hingedly secured to the hinge member 72 may be provided to close the aperture 70 when the latter is not in use.

To the lower end 41 of the flexible hose 35 and 36, a pneumatic lubricant ejector 42 is operatively secured;—the length of the pendent portion 43 of the hose 35 and 36 being such as pendently to support the pneumatic lubricant ejector 42, so that it will always clear the floor 13 of the service station, to a suitable extent. The pneumatic lubricant ejector 42 includes the handle portion 44, the pneumatic cylinder 45 and the lubricant cylinder 46, and the short flexible discharge hose 47, through which the lubricant is finally ejected, and by means of which temporary connection is established with the bearing to be lubricated. The handle member 44 is provided with the openings 48 and 49, through which the fingers of the operator may be extended so as to obtain a grip on the pneumatic ejector unit. An air passageway 50 is provided in the handle member, to which the air hose 35 is operatively connected, as indicated particularly in Figure 7. The air passageway 50 extends to a valve seat 51 in the handle member 44, and then continues through the pasageway 52, into the rear end of the pneumatic cylinder 45. A valve 53 is provided within the handle member 44, in operative juxtaposition to the valve seat 51, and carried by a valve stem 54, which extends through the handle member 44 and terminates exteriorly thereof in the finger operable actuating button 55, in the finger opening 48 of the handle member 44. The valve stem 54 is of a lesser cross-sectional area than the passageway through which it extends, so that when the valve 53 is displaced from the valve seat 51, air may pass through the passageway containing the valve stem 54, into the air pasageway 52 and hence into the pneumatic cylinder 45. An external valve seat 56 is provided at the outer end of the passageway containing the valve stem 54, and a correspondingly shaped valve 57 is carried by the button 55, so that when said finger operable actuating button 55 is depressed, for the purpose of admitting air into the pneumatic cylinder, the passageway is sealed against the escape of air around the outer end of the valve stem 54.

Within the pneumatic cylinder 45 is operatively disposed the pneumatic piston 58, of any suitable construction, while within the lubricant cylinder 46 is operatively disposed the lubricant ejecting piston 59, the rear end of which is operatively connected to the pneumatic piston 58, in any suitable manner, as for instance that shown in Figure 7. A helical compression spring 60 is adapted to return both pistons.

The lubricant hose 36 is operatively connected to a lubricant passageway 61, which terminates at 62, in the lubricant cylinder 46, just in advance of the rearmost position of the lubricant piston 59, as shown in Figure 7. A spring-pressed ball check valve 63, within the chamber 64, is urged into seating contact with the valve seat 65, by the helical compression spring 66, so as normally to close the discharge end of the lubricant cylinder 46, and to prevent the passage of lubricant from the hose 47 into the lubricant passageway 61, when the lubricant piston 59 is retracted. The free end of the flexible connecting hose 47 is provided with any suitable coupler, connector or nozzle 67, as for instance, a bayonet type coupler, or any other suitable type coupler or connector, by means of which the hose 47 is detachably secured to the bearings to be lubricated, or to the lubricant receptacles carried by said bearings.

In the operation of my novel lubricating system, a suitable quantity of lubricant is placed into the lubricant storage tank 15, through the opening 16, and said opening is then closed by means of the closure member or cap 17. Air is then admitted into the tank 15 through the valve 21, so as to place the entire body of lubricant under air pressure. Upon opening the valves 19 and 25 and 26, the lubricant in the tank 15, is conveyed under a relatively low pressure of between one hundred and two hundred pounds, through the swivel arm 33 into the lubricant cylinder 46 in the pneumatic ejector 42. The force of the spring 66 is so regulated in the pneumatic ejector 42, that the ball check valve 63 will prevent the passage of lubricant beyond the valve seat 65 at the original or initial low pressure at which the lubricant is supplied into the lubricant cylinder 46. The compressed air, similarly under a pressure of between one hundred and two hundred pounds, is conveyed through the swivel arm 33 to the manually operable valve 57 in the pneumatic lubricant ejector 42.

The arm 43 is then swung into any suitable position with respect to the automobile on the lift 10 or 11, as the case may be, so that the connecting hose 47 may be easily attached to the bearing to be lubricated. The hose 47 may thus be carried around the automobile from bearing to bearing, and when the lubricating operation is finished, the hose may be swung out of the way into any suitable position. By this means not only is the lubrication of the automobile greatly facilitated, but the physical effort required for the lubricating operation is reduced to a minimum, because the lubricant ejector is supported, in main, from the arm 33, and requires only to be brought into position for the lubricating operation. So too, not only is the lift maintained free of all obstructions of hoses and the like, but the hoses as well as the lubricant ejector are protected against damage while not in use, and also while the car is being moved on and off the lift.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:—

1. In a lubricating system for automobiles, the combination of means for supporting an automobile a suitable distance above the floor, a remote lubricant storage tank, a remote source of compressed air, a swivel arm pivotally supported above said automobile supporting means and adapted to swing in a generally horizontal plane above the automobile when supported in an elevated position, a lubricant conduit extending from said lubricant storage tank to the pivoted end of said swivel arm, an air conduit extending to the pivoted end of said swivel arm from said source of compressed air, a compressed air conduit and a lubricant conduit carried by said swivel arm, extending from the pivoted end to the free end thereof, and being flexibly connected to the compressed air conduit and lubricant conduit leading from the respective sources of supply to said pivoted end of the swivel arm, a flexible air hose and a flexible lubricant hose extending downwardly from said swivel arm and pendently supported thereby, at a point spaced substantially from the pivotal center thereof, a lubricant ejector pendently supported on the free end of said lubricant hose and said air hose and operatively connected thereto, means for delivering lubricant from said lubricant storage tank through said lubricant conduits, and said lubricant hose, into said lubricant ejector at a relatively low pressure, means in said lubricant ejector for preventing the flow of lubricant at said relatively low pressure, and manually controllable pneumatic means in said lubricant ejector for ejecting lubricant therefrom at a pressure greater than the pressure at which the lubricant is supplied to said lubricant ejector.

2. In a lubricating system for automobiles, the combination of means for supporting an automobile a suitable distance above the floor, a remote lubricant storage tank, a remote source of compressed air, a swivel arm pivotally mounted above said automobile supporting means and adapted to swing in a generally horizontal plane above the automobile when the latter is supported in an elevated position, a lubricant conduit extending from said lubricant storage tank to the pivoted end of said swivel arm, an air conduit extending from said source of compressed air to the pivoted end of said swivel arm, a compressed air hose and a lubricant hose carried by said swivel arm, each being flexibly connected at one end to said compressed air conduit and said lubricant conduit respectively, extending from the respective sources of supply to said pivoted end of the swivel arm, and the other end of said air hose and said lubricant hose extending downwardly from said swivel arm and being pendently supported thereby, at a point spaced substantially from the pivotal center thereof, a lubricant ejector pendently supported on the free end of said hose and operatively connected thereto, supported in operative relation to said automobile supporting means, means for delivering lubricant at a relatively low initial pressure from said lubricant storage tank through said lubricant conduit, and said lubricant hose, into said lubricant ejector, means in said lubricant ejector for normally preventing the flow of lubricant at said relatively low initial pressure, and manually controllable pneumatic means in said lubricant ejector for ejecting lubricant therefrom at a final pressure greater than the initial pressure at which the lubricant is supplied to said lubricant ejector and greater than the pressure of the air supplied to said lubricant ejector.

3. In a lubricating system for automobiles, the combination of means for supporting an automobile a suitable distance above the floor, a remote lubricant storage tank, a remote source of compressed air, a stationary swivel housing mounted above said automobile supporting means, a swivel arm pivotally mounted in said swivel housing and adapted to swing in a generally horizontal plane above the automobile when the latter is supported in an elevated position, a lubricant conduit extending from said lubricant storage tank to said swivel housing, an air conduit extending from said source of compressed air to said swivel housing, a compressed air hose and a lubricant hose carried by said swivel arm, each being flexibly connected at one end, within said swivel housing, to said compressed air conduit and said lubricant conduit respectively, extending from the respective sources of supply to said pivoted end of the swivel arm, and the other end of said air hose and said lubricant hose extending downwardly from said swivel arm and being pendently supported thereby, at a point spaced substantially from the pivotal center thereof, a lubricant ejector pendently supported on the free end of said hose and operatively connected thereto, and supported in operative relation to said automobile supporting means, means for delivering lubricant at a relatively low initial pressure from said lubricant storage tank through said lubricant conduit, and said lubricant hose, into said lubricant ejector, means in said lubricant ejector for normally preventing the flow of lubricant at said relatively low initial pressure, and manually controllable pneumatic means in said lubricant ejector for intermittently ejecting lubricant therefrom at a final pressure greater than the initial pressure at which the lubricant is supplied to said lubricant ejector, and greater than the pressure of the air supplied to said lubricant ejector.

4. Lubricating means, including a stationary overhead swivel support, carried by any suitable supporting structure, a remote source of lubricant, means for automatically delivering lubricant from said remote source to said swivel support, under pressure, a lateral arm pivotally carried by said swivel support, a lubricant conduit carried by said arm, a pendent, flexible lubricant conduit in continuation thereof, extending downwardly from said arm at a point spaced substantially from the pivotal center thereof, and means at the lower end of said pendent flexible lubricant conduit for controlling the discharge of lubricant and for boosting the pressure of the discharging lubricant, above the pressure at which said automatic lubricant delivering means has delivered said lubricant to said swivel support.

5. Lubricating means, including a stationary over-head swivel support, carried by any suitable supporting structure, a remote source of lubricant, means for automatically delivering lubricant from said remote source to said swivel support, under pressure, a lateral arm pivotally carried by said swivel support, a lubricant conduit carried by said arm, a pendent flexible lubricant conduit in continuation thereof, extending downwardly from said arm, at a point spaced substantially from the pivotal center thereof, means at the lower end of said pendent flexible lubricant conduit for ejecting lubricant at a pressure, higher than the pressure at which said automatic lubricant delivering means has delivered said lubricant to said swivel support.

6. Lubricating means including a stationary over-head swivel support carried by any suitable supporting structure, a swivel arm pivotally carried by said stationary swivel support, a lubricant conduit and an air conduit carried by said swivel arm and having flexible and pendent portions extending downwardly from the swivel arm at a point spaced substantially from the pivotal center thereof, and a pneumatic lubricant-forcing device carried by the lower ends of said pendent flexible conduits.

7. Lubricating means including a stationary over-head swivel support carried by any suitable supporting structure, a swivel arm pivotally carried by said stationary swivel support, a lubricant conduit and an air conduit carried by said swivel arm and having flexible and pendent portions extending downwardly from the swivel arm at a point spaced substantially from the pivotal center thereof, a pneumatic lubricant-forcing device carried by the lower ends of said pendent flexible conduits, and remote means for supplying lubricant and air, both under pressure, to said lubricant and air conduits, respectively.

8. A lubricating system, including relatively low pressure lubricant feeding means, a main supply header extending from said feeding means, having a plurality of outlets, a plurality of overhead swivel arms associated with said outlets, a plurality of individual pressure-boosting devices having relatively high pressure lubricant chambers flexibly connected with said header, through said swivel arms, piston means for developing relatively high pressure within each chamber, and means for controlling the lubricant feeding means by the pressure of the lubricant in said supply header.

9. A lubricating system, including a relatively low pressure feeding unit, a main supply header extending from said unit and having an overhead outlet, a lateral overhead swivel-arm associated with said overhead outlet, a pressure-boosting device having a relatively high pressure lubricant chamber flexibly connected with said header, through said swivel arm, piston means for developing relatively high pressure within said chamber, and means for controlling the lubricant feeding unit by the pressure of the lubricant in said supply header.

10. A lubricating system, including relatively low pressure lubricant feeding means, a supply header extending from said lubricant feeding means, having a plurality of outlets, a plurality of overhead swivel arms associated with said outlets, a plurality of pendent, individual pressure-boosting devices having relatively high pressure lubricant chambers flexibly connected with said header through said swivel arms, piston means for developing relatively high pressure within each chamber, and pressure responsive means for controlling the pressure developed by said lubricant feeding means in said header, and means for individually and selectively operating the pressure-boosting devices.

11. A lubricating system, including a relatively low pressure lubricant feeding unit, a main supply header extending from said unit and having an overhead outlet, a lateral overhead swivel-arm associated with said overhead outlet, a pendent, pressure-boosting device having a relatively high pressure lubricant chamber flexibly connected with said head through said swivel arm, piston means for developing relatively high pressure within said chamber, and pressure-responsive means for controlling the pressure developed by said feeding unit in said header, and means for controlling the pressure-boosting device at the will of the operator.

12. A lubricating system for lubricating automobiles, comprising relatively low pressure lubricant feeding means, a lubricant supply header connected to said lubricant feeder means, having a plurality of outlets, a plurality of overhead swivel arms associated with said outlets, a plurality of flexible conduits connected with said outlets, respectively, through said swivel arms, a relatively high-pressure lubricant gun for each flexible conduit having a lubricant chamber connected to the end of the respective flexible conduit, a main air supply source, conduits extending from said source to said lubricant guns through said swivel arms, said lubricant guns including air cylinders and pistons in said air cylinders for discharging the lubricant in said lubricant chambers under higher pressure, said cylinders connected to said air supply source, and means for individually and selectively controlling the connection of said air cylinders to said air supply source.

13. A lubricating system for lubricating automobiles comprising a relatively low pressure lubricant forcing device, a lubricant supply header connected to said forcing device, having an overhead outlet, a lateral, overhead swivel arm associated with said overhead outlet, a flexible conduit connected to said overhead outlet, through said swivel arm, a relatively high pressure lubricant gun for said flexible conduit having a lubricant chamber connected to the end of the flexible conduit, a main air supply source, a conduit extending from said source to said lubricant gun through said swivel arm, said lubricant gun including an air cylinder and a piston in said air cylinder for discharging the lubricant in said lubricant chamber, said cylinder connected to said main air supply source, and means for controlling the connection of said air cylinder to said air supply source at the will of the operator.

14. A lubricating system for lubricating automobiles, comprising relatively low-pressure lubricant-feeding means, a lubricant supply header connected to said feeding means, having a plurality of outlets, a plurality of over-head swivel arms associated with said outlets, a plurality of flexible conduits connected to said outlets, through said swivel arms, a pneumatically operated lubricant discharge device at the end of each flexible conduit, a main air supply conduit, individual air conduits extending from said main air-supply conduit, through said swivel arm, to said pneumatically operated lubricant discharge device, for operating the same, and means at each pneumatically operated lubricant discharge device for individually and selectively operating the pneumatically operated lubricant discharge devices.

15. A lubricating system for lubricating automobiles comprising a relatively low pressure lubricant forcing device, a lubricant supply header connected to said forcing device, having an overhead outlet, a lateral, over-head swivel arm associated with said over-head outlet, a flexible conduit connected to the overhead outlet of said header through said swivel arm, a pneumatically operated lubricant discharge device at the end of said flexible conduit, a main air supply conduit, an air conduit extending from said main air supply conduit through said swivel arm, to said pneumatically operated lubricant discharge device for operating the same, and means at said pneumatically operated lubricant discharge device for controlling the pneumatically operated lubricant discharge device at the will of the operator.

In testimony whereof, I have hereunto set my hand this 18th day of May, 1931.

RUSSELL J. GRAY.